United States Patent [19]

Koga et al.

[11] Patent Number: 5,262,142

[45] Date of Patent: Nov. 16, 1993

[54] COMPOSITE OXIDE OF FORMULA $R_2O.AL_2O_3.TIO_2.SIO_2.H_2O$, WHERE R IS AN ALKALI METAL

[75] Inventors: Yoshiaki Koga, Tokuyama; Genji Taga, Shinnanyo, both of Japan

[73] Assignee: Tokuyama Soda Kabushiki Kaisha, Yamaguchi, Japan

[21] Appl. No.: 922,837

[22] Filed: Jul. 31, 1992

[30] Foreign Application Priority Data

Aug. 6, 1991 [JP] Japan .................. 3-196490
Feb. 4, 1992 [JP] Japan .................. 4-018846
Apr. 28, 1992 [JP] Japan .................. 4-109636

[51] Int. Cl.$^5$ .................. C01B 33/26
[52] U.S. Cl. .................. 423/328.1; 106/416; 106/446; 423/327.1; 423/332; 501/6; 502/243
[58] Field of Search .......... 423/327.1, 328.1, 332, 423/333, 334; 252/315.5; 501/6, 8; 106/416, 444, 446, 449, 483; 502/242, 243

[56] References Cited

U.S. PATENT DOCUMENTS

| | | | |
|---|---|---|---|
| 4,542,117 | 9/1985 | Morris et al. | 502/66 |
| 5,112,402 | 5/1992 | Freeman et al. | 106/416 |
| 5,167,707 | 12/1992 | Freemen et al. | 106/416 |

FOREIGN PATENT DOCUMENTS

| | | |
|---|---|---|
| 3203515 | 4/1983 | Fed. Rep. of Germany . |
| 30-7715 | 10/1955 | Japan . |
| 39-3408 | 4/1964 | Japan . |
| 45-13449 | 5/1970 | Japan . |

*Primary Examiner*—Olik Chaudhuri
*Assistant Examiner*—Ken Horton
*Attorney, Agent, or Firm*—Wenderoth, Lind & Ponack

[57] ABSTRACT

There is provided a composite oxide represented by the formula $$iR_2O.jAl_2O_3.kTiO_2.mSiO_2.nH_2O$$

wherein R denotes an alkali metal, i is 0.3 to 1, k is 0 to 0.9, j+k=1, m is 7 to 70 and n is 0.2 to 0.4, said composite oxide being amorphous, and its cumulative specific pore volume of pores having a pore radius of $10^4$ A or less being 2.0 to 3.0 cc/g. This composite oxide can be produced by a process which comprises a first reaction step of adding an acid aqueous solution capable of forming a silicate by reaction with an alkali silicate to 7 to 10% by weight, calculated as silica, of an alkali silicate aqueous solution in the presence of a salt at 10° to 45° C. such that a neutralization ratio becomes 20 to 40%, and a second reaction step of heating the reaction solution obtained in the above reaction at a temperature of 90° C. to a boiling point of the reaction solution and adding thereto an acid aqueous solution capable of forming a silicate by reaction with an alkali silicate such that pH of the reaction solution becomes 3 to 5.

3 Claims, 4 Drawing Sheets

COMPOSITE OXIDE OF FORMULA $R_2O.AL_2O_3.TIO_2.SIO_2.H_2O$, WHERE R IS AN ALKALI METAL

Paper-making fillers are used by incorporating same in a starting pulp slurry at the time of paper-making. Such paper-making fillers are principally used to improve whiteness of a paper, improve opacity of the paper, prevent ink printed on the surface from reaching a reverse side, i.e., prevent so-called opacity of the paper after printing, and so forth.

As the paper-making filler, a silica containing composite oxide having good absorption characteristics of ink is known. For example, Japanese Patent Publication Nos. 7715/1955, 3408/1964 and 13449/1970 disclose a composite oxide comprising aluminum silicate, titanium silicate, zirconium silicate, etc. as a paper-making filler. Of these paper-making fillers, especially aluminum silicate which is a composite oxide of alumina and silica can preferably be used because fillability in a paper is good owing to adaptability to a starting pulp caused by alumina contained therein.

However, in case of adding such an aluminum silicate to a paper as a paper-making filler, there has been a problem that when the basic weight of paper reaches less than 43 g/m² in order to make the paper lightweight, an effect of preventing opacity of the paper after printing becomes poor.

The present inventors have made assiduous investigations over a relation of properties of a filler and an effect of preventing opacity after printing of the paper obtained by addition of the filler.

As a result, it has been discovered that a specific pore size distribution of the filler and its pore volume are important in the effect of preventing opacity of the paper after printing. That is, findings have been acquired that absorption of ink in a composite oxide is greatly influenced by a cumulative specific pore volume (hereinafter simply referred to at times as a "pore volume") of pores having a pore radius of $10^4$ Å or less and that when the pore volume is small, the paper using the composite oxide does not exhibit the effect of preventing opacity of the paper after printing.

On the basis of these findings, aluminum silicate proposed so far as a paper-making filler has been studied. As a result, a pore volume of pores having a pore radius of $10^4$ Å or less is at most 1.9 cc/g, and a paper using such a composite oxide is, as stated before, insufficient in effect of preventing opacity of the paper after printing.

Accordingly, it is an object of this invention to provide a composite oxide which is higher in pore volume of pores having a pore radius of $10^4$ Å or less than the conventional composite oxides and which can suitably be used as a paper-making filler excellent in absorbability of ink and effect of preventing opacity of the paper after printing even if its amount added to the paper is small.

Further, this invention is to provide a process for producing the composite oxide with good efficiency.

The other objects of this invention will be made clear from the foregoing explanation.

The composite oxide provided by this invention is represented by formula (A)

(A)

wherein R denotes an alkali metal, i is 0.3 to 1, k is 0 to 0.9, j+k=1, m is 7 to 70 and n is 0.2 to 0.4, said composite oxide being amorphous, and its cumulative specific pore volume of pores having a pore radius of $10^4$ Å or less being 2.0 to 3.0 cc/g.

The composite oxide of this invention can be confirmed as follows.

(1) Chemical composition of formula (A)

Confirmation can be conducted by determining the amounts of $R_2O$, $Al_2O_3$, $TiO_2$ and $SiO_2$ by a fluorescent X-ray method and calculating a molar ratio of the respective oxides.

(2) Crystal structure

That the composite compound is amorphous can be confirmed by X-ray diffraction thereof.

(3) Cumulative specific pore volume of pores having a specific pore radius

The composite compound dispersed in water is filtered, and the obtained cake is dried at 105° C. A pore volume of the dried cake is measured by a mercury porosimeter. A cumulative graph showing a relationship of the pore volume to the pore radius is prepared, and the pore volume in the specific pore radius can be found on the basis of the cumulative graph.

The composite oxide of this invention, as represented by the formula, makes silica and alumina essential oxide components, and can contain an alkali metal oxide and/or titania at a specific ratio. Especially a composite oxide of the formula wherein i is 0.5 to 1, k is 0 to 0.9, j+k=1, m is 15 to 65 and n is 0.2 to 0.4 is preferably as a paper-making filler because the effect of preventing opacity of the paper after printing is excellent. The composite oxide containing titania can increase characteristics such as whiteness and opacity of paper in addition to the effect of preventing opacity of the paper after printing.

Since the composite oxide of this invention has the pore volume of pores having the specific pore radius within the specific range, it exhibits the excellent effect as the paper-making filler. That is, because the cumulative specific pore volume of pores having the pore radius of $10^4$ Å or less is 2.0 to 3.0 cc/g, not only the amount of ink absorbed is large, but also a very good effect of preventing opacity of the paper after printing is exhibited which has been hardly achieved with the conventional paper-making filler made of aluminum silicate.

The composite oxide of this invention has the specific pore volume as well as a characteristic pore distribution that the cumulative specific pore volume of pores having a pore radius of $5 \times 10^4$ Å or less is 2.4 to 4.0 cc/g, that of pores having a pore radius of 3000 to $4 \times 10^4$ Å is 0.6 cc/g or more, especially 0.8–1.6 cc/g, and that of pores having a pore radius of 100 to 1000 Å is 0.6 cc/g or more, especially 0.7 to 1.6 cc/g. As the pore volumes of pores having the specific pore radii are within the above ranges, the excellent effect of preventing opacity of the paper after printing can be shown when the composite oxide is used as a paper-making filler.

Namely, a printing ink for paper is composed of a pigment and a vehicle. From the experiments of the present inventors, it has been found that there is a difference in pore radius of fillers that absorb and adsorb the pigment and the vehicle, namely the pigment is absorbed and adsorbed in pores having a pore radius of 3000 to $4 \times 10^4$ Å, and the vehicle in pores having a pore radius of 100 to 1000 Å, respectively.

Since the pore volumes occupied by the pores having these specific pore radii are quite large as noted above, the composite oxide of this invention exhibits the excellent effect of preventing opacity of the paper after printing as a paper-making filler.

Meanwhile, regarding aluminum silicate, there has been almost no literature that focusses on the pore radius as noted above. Besides, aluminum silicate so far known as a paper-making filler is quite low in pore volume of pores having a pore radius of $10^4$ Å or less compared to the composite oxide of this invention; pore volumes of pores having pore radii of $10^4$ Å or less, 3000 to $4 \times 10^4$ Å and 100 to 1000 Å are also small compared to the composite oxide of this invention. For example, in case of aluminum silicate commercially available as a paper-making filler, as shown in Comparative Examples to be described later, a pore volume of pores having a pore radius of $10^4$ Å or less is at most 1.9 cc/g, that of pores having a pore radius of $5 \times 10^4$ Å or less is at most 2.3 cc/g, that of pores having a pore radius of 3000 to $4 \times 10^4$ Å is at most 0.5 cc/g, and that of pores having a pore radius of 100 to 1000 Å is at most 1.2 cc/g.

The composite oxide of this invention is agglomerated particles formed by agglomerating single ultimate particles having a particle size of 8 to 50 nm, said agglomerated particles having a particle size of 1 to 500 μm and an average particle size of 10 to 25 micrometers measured in a state of a slurry dispersed in water. A specific surface area of the composite oxide of this invention is usually 100 to 300 m²/g.

Moreover, pH of the dispersion obtained by dispersing the composite oxide of this invention in water is 5 to 7 and nearly neutral. Accordingly, the composite oxide of this invention little dissolves in water.

The composite oxide of this invention can be produced by, e.g., a process which comprises a first reaction step of adding an acid aqueous solution capable of forming a silicate by reaction with an alkali silicate to 7 to 10% by weight, calculated as silica, of an alkali silicate aqueous solution in the presence of a salt at 10° to 45° C. such that a neutralization ratio becomes 20 to 40%, and a second reaction step of heating the reaction solution obtained in the above reaction at a temperature of 90° C. to a boiling point of the reaction solution and adding thereto an acid aqueous solution capable of forming a silicate by reaction with an alkali silicate ("an acid aqueous solution capable of forming a silicate by reaction with an alkali silicate" is hereinafter simply called "an acid aqueous solution) such that pH of the reaction solution becomes 3 to 5.

In the first step of the above process, the acid aqueous solution is added to 7 to 10% by weight, calculated as silica, of an alkali silicate aqueous solution at 10° to 45° C. such that a neutralization ratio becomes 20 to 40%.

As the alkali silicate, sodium silicate is ordinarily used. The concentration of the alkali silicate aqueous solution is adjusted to 7 to 10% by weight, preferably 8 to 9% by weight, calculated as silica. When the concentration of the alkali silicate aqueous solution is deviated from the above range, the pore volume of the resulting composite oxide becomes small, making it impossible to obtain the composite oxide of this invention.

As the acid aqueous solution which is added to the alkali silicate aqueous solution, a known acid aqueous solution corresponding to the oxide represented by the above formula is used without limitation. Examples thereof are aluminum sulfate and titanium sulfate. The acid aqueous solution is not particularly limited. Generally, an amount of a metal ion is 2 to 7% by weight calculated as an oxide, and an amount of an acid is 10 to 30 weight/volume %, preferably 15 to 25 weight/volume %. It is especially preferable that the amount of an Al ion is 2 to 5% by weight, calculated as $Al_2O_3$ and the amount of a Ti ion is 4 to 7% by weight, calculated as $TiO_2$.

It is also possible to use a mineral acid conjointly with the acid aqueous solution. Any known mineral acid will do. Concrete examples of the mineral acid are hydrochloric acid, sulfuric acid and nitric acid. Sulfuric acid is commonly used. The concentration of the mineral acid is not particularly limited, and may be selected from the range of 10 to 30 weight/volume %.

The acid aqueous solution is added to the alkali silicate aqueous solution such that the neutralization ratio becomes 20 to 40%.

In the present specification and claims, when the amount of the acid aqueous solution required to neutralize the overall amount of the alkali silicate aqueous solution is rated at 100%, the neutralization ratio shows a ratio of the acid aqueous solution used therein.

When the neutralization ratio is lower than 20%, the single ultimate particles become large to weaken agglomeration of the particles and a pore volume of pores having a pore radius of $10^4$ Å or less is decreased, making it hard to obtain the composite oxide of this invention having the pore volume within the specific range. When the neutralization ratio exceeds 40%, agglomeration of the particles becomes strong, and the pore volume of pores having a pore radius of $10^4$ Å or less is decreased; especially, the pore volume of pores having a pore radius of 3000 to $4 \times 10^4$ Å becomes less than 0.6 cc/g.

In order to obtain a composite oxide excellent in absorbability of ink and effect of preventing opacity of the paper after printing when used as a paper-making filler, it is advisable that the neutralization ratio is within the range of 23 to 35%.

In the process for producing the composite oxide, the reaction of the first step is carried out at 10° to 45° C. That is, when the reaction temperature is deviated from the above range, the pore volume of pores having the pore radius of $10^4$ Å or less is decreased, making it hard to obtain the composite oxide of this invention having the pore volume within the specific range.

Next, in the second step of the process for producing the composite oxide, the reaction solution obtained in the first step is heated at a temperature of 90° C. to a boiling point of the reaction solution, preferably, 95° C. to the boiling point of the reaction solution. When the temperature of the reaction solution is deviated from the above range, the pore volume of pores having the pore radius of $10^4$ Å or less is decreased, and the composite oxide of this invention having such a pore volume within the specific range can hardly be obtained. The pore volume of 3,000 to $4 \times 10^4$ Å is also decreased.

In the second step, after heating, the reaction solution is desirably left to stand at the heating temperature (so-called ageing) because it allows strong bonding of the agglomerated particles of the resulting composite oxide and increases the pore volumes occupied by the intended specific pores. The ageing time is not particularly limited, but may usually be selected from the range of 10 to 30 minutes.

In the second step, the acid aqueous solution is added such that pH of the reaction solution becomes 3 to 5. When pH of the reaction solution exceeds 5, formation of components of the composite oxide becomes insufficient, and the pore volume of pores having the pore radius of $10^4$ Å or less is decreased, making it difficult to obtain the composite oxide of this invention having such a pore volume within the specific range. Even when pH of the reaction solution is less than 3, it does not greatly influence the pore volume of the resulting composite oxide, but prevents decrease in the amount of the alumina component of the composite oxide. For this reason, it is advisable that pH is 3 or more, preferably 4 or more.

It is desirous to gradually add the acid aqueous solution. Usually, a necessary amount of the acid aqueous solution is added over a period of 60 to 120 minutes either continuously or intermittently.

In the process for producing the composite oxide of this invention, it is desirable to conduct the neutralization reaction of the first step and/or the second step in the presence of a salt for increasing the pore volume occupied by the intended specific pores. As the salt, known water-soluble inorganic salts can be employed without limitation. Generally, water-soluble inorganic salts having a nucleating activity is preferably adopted. Concrete examples thereof are alkali metal salts such as sodium chloride, sodium sulfate, sodium nitrate, potassium chloride, potassium sulfate and potassium nitrate. Although the amount of the salt is not particularly limited, it is usually selected from 0.5 to 5% by weight calculated as an oxide in an alkali silicate aqueous solution. It is advisable to add the salt to the reaction solution before adding the acid aqueous solution because the pore distribution is good and the given pore volume is less decreased even in milling of the composite oxide in the slurry state which is conducted as required.

The composite oxide of this invention is, when used as a paper-making filler, generally a filler dispersed in a starting pulp of a paper; it can also be used as a paper coating.

When the composite oxide of this invention is used as a paper-making filler, a paper can be made by, after formation of the composite oxide, removing extra salt by means of filtration washing, etc., storing the residue in a state of slurry dispersed in water, conducting milling and classification, and mixing the resulting product in a slurry state as such with a starting pulp. It is of course possible that the composite oxide formed by the above process is dried, then stored as a powder, redispersed in water when mixed with the starting pulp and used. Although the amount of the composite oxide blended with the pulp fibers is not particularly limited, the composite oxide of this invention is present with the cumulative specific pore volume of pores having the specific pore radius, with the result that the effect of preventing opacity of the paper after printing can be exhibited enough with its small amount. Accordingly, it is usually 0.1 to 2% by weight, preferably 0.3 to 1.5% by weight.

In the composite oxide of this invention, the pore volume of pores having the pore radius of $10^4$ Å or less is very large. The composite oxide of this invention therefore exhibits excellent absorption of ink. Especially, the composite oxide wherein the pore volume of pores having the pore radius of $5 \times 10^4$ Å or less is 2.4 to 4.0 cc/g, that of pores having the pore radius of 3000 to $4 \times 10^4$ Å is 0.6 cc/g or more and that of pores having the pore radius of 100 to 1000 Å is 0.6 cc/g or more, when used as a paper-making filler, quite high in effect of preventing opacity of the paper after printing, which is greatly effective for making the paper lightweight.

This invention is illustrated more specifically by referring to the following Examples and Comparative Examples, but is not limited thereto.

BRIEF DESCRIPTION OF THE DRAWINGS

In the attached drawings.

By the way, various properties in this invention were measured by the following methods.

(1) Pore volume 100 ml of the reaction solution containing the composite oxide were filtered with a Buchner funnel, and the composite oxide was washed with 500 ml of water. The obtained cake was dried with a hot air drier at 105° C. for 24 hours. A pore volume of the dried cake was then measured through a mercury porosimeter. A cumulative graph showing a relationship of a pore volume to a pore radius was prepared, and a pore volume in a specific pore radius was found on the basis of said graph.

(2) Average particle size of particles after dispersed in water

It was measured by Coulter Multisizer (a trademark for a machine manufactured by Coulter Electronics Inc.).

(3) pH

A reaction solution was sampled and pH was measured by a pH meter (manufactured by Horiba Seisakusho).

(4) Oil absorption

Oil absorption was measured according to JIS K5101.

(5) Chemical analysis

Chemical analysis was performed with a fluorescent X-ray analyzer (manufactured by Rigaku Denki K. K.).

(6) Paper-making test

As a pulp, a mixture comprising 10 parts by weight of NBKP (needle leaf bleaching craft pulp), 45 parts by weight of TMP (thermomechanical pulp) and 45 parts by weight of DIP (dinking pulp) was stirred with a beater for 5 to 6 minutes, and 2% by weight, based on the dry pulp, of the composite oxide of this invention was then added, followed by stirring the blend for 15 minutes. Subsequently, pH of the slurry was adjusted to 4.5 with aluminum sulfate. Said slurry was then made into a paper by a square sheet machine (300 mm × 300 mm), and press-dehydrated. The resulting wet paper was dried with a rotary dryer having a surface temperature of 110° C., and then seasoned at a relative humidity of 65% and a temperature of 25° C. for 24 hours to obtain a paper having a basic weight of 40 g/m².

(7) Opacity of paper after printing

A solid print of 80 × 120 mm was applied to one side of a paper with a commercial printer (RICOH PRIPORT SS880: a trademark for a machine manufactured by Ricoh Co., Ltd.), and opacity of paper after printing was then measured.

$$\text{Opacity of paper after printing} = \frac{\text{Reflectance of a reverse side of a paper after printing}}{\text{Reflectance of a reverse side of an unprinted paper}} \times 100$$

(8) Whiteness of paper

Whiteness of paper was measured according to JIS P8123.

(9) Opacity of paper

Opacity of paper was measured according to JIS P8138.

EXAMPLES 1 to 8

Commercial sodium silicate ($SiO_2$ 26.50 wt./vol. % by weight, $SiO_2/Na_2O$ molar ratio 3.04), a sodium sulfate ($Na_2O$ 2.38 wt./vol. % by weight) and water were charged in a reaction vessel of an external heating system such that a concentration calculated as silica shown in Table 1 were reached, and they were stirred.

In the first step, an acid aqueous solution of a type shown in Table 1 was charged such that a temperature of a reaction solution and a neutralization ratio shown in Table 1 were reached. Subsequently, in the second step, the temperature was elevated to a temperature shown in Table 1, and stirring was then conducted in that state for a time shown in Table 1. The acid aqueous solution was then charged over a course of 100 minutes such that pH of the reaction solution became a value shown in Table 1 to terminate the reaction.

After the reaction solution was filtered, the cake was washed with water and redispersed in water such that the solids content became 13 to 14%. 600 ml of the dispersion were charged in a 2-liter polyethylene container, milled together with 1 kg of glass beads having a size of 2 mm at 420 rpm for 5 minutes and screened through a 145-mesh sieve. A particle size distribution of the solids content in the dispersion under the sieve was measured.

Thereafter, the dispersion was filtered, and the cake was washed with water and dried to obtain a composite oxide.

A chemical composition of the obtained composite oxide was measured, and its pore size distribution was measured with a mercury porosimeter. The pore volume was calculated for each given pore radius. Moreover, a crystal structure was confirmed by X-ray diffraction, an average particle size in a slurry state, pH and oil absorption were measured, and a test of opacity after printing was run.

The results are shown in Table 2.

Incidentally, in a paper-making test, the composite oxide obtained in the above reaction was directly made into a paper without separation from the dispersion and drying.

Figure 1:
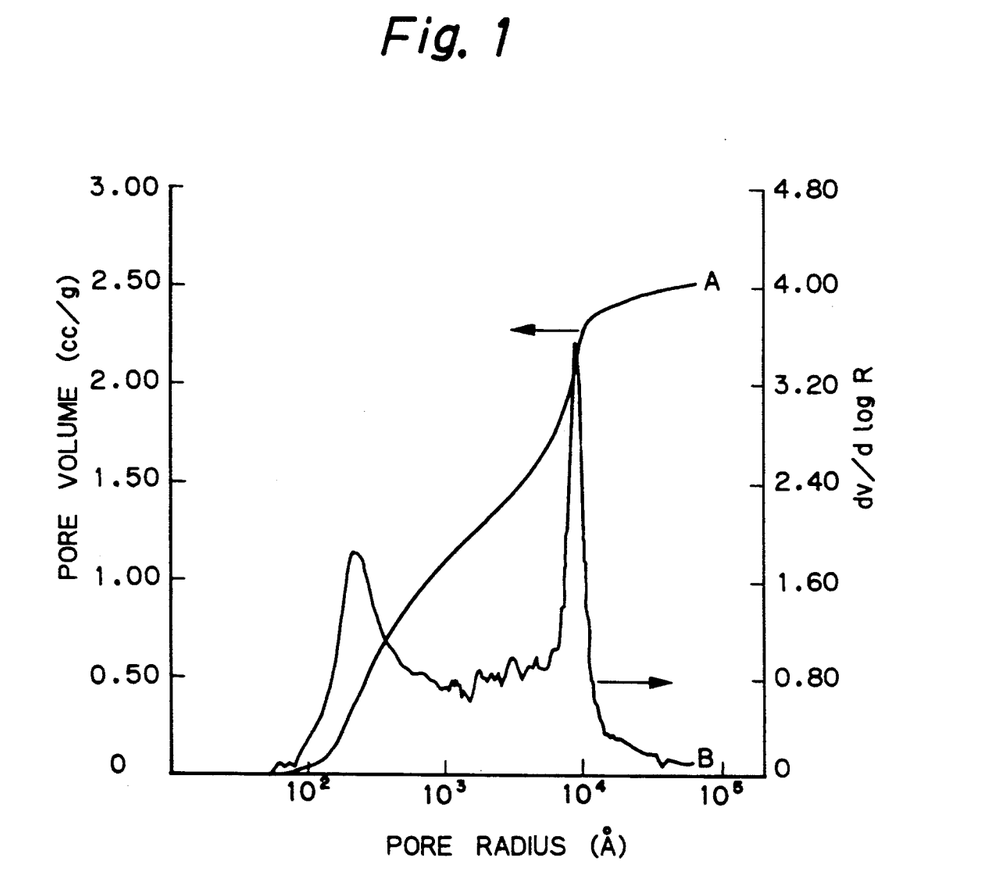
FIGS. 1, 2, 3 and 4 show respectively graphs showing results of measuring pore distributions of composite oxides in Examples 1 and 2 and Comparative Examples 1 and 2.
Figure 2:
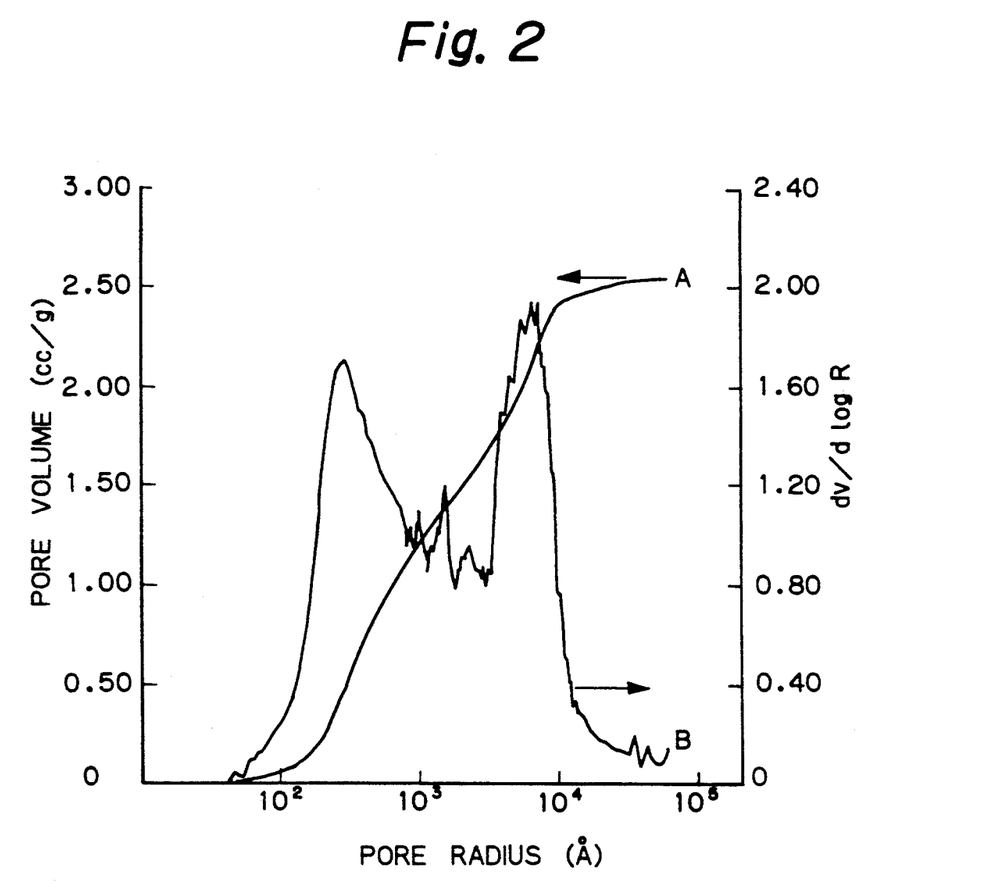
Figure 3:
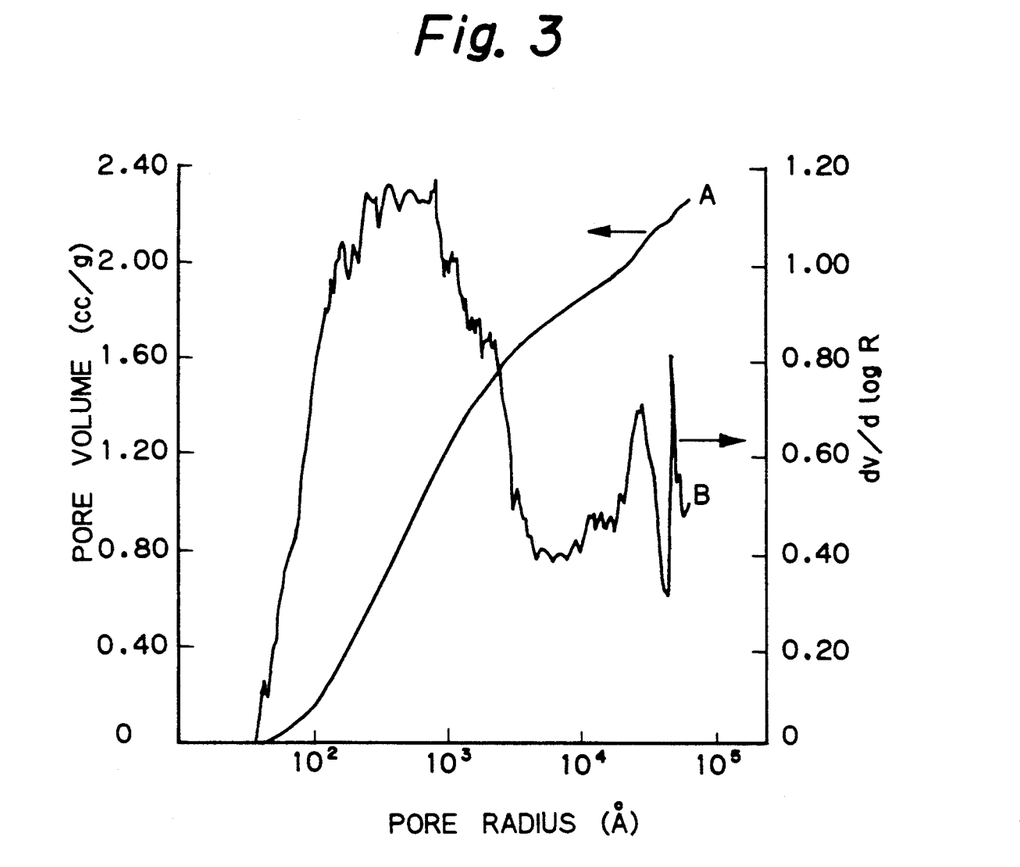
Figure 4:
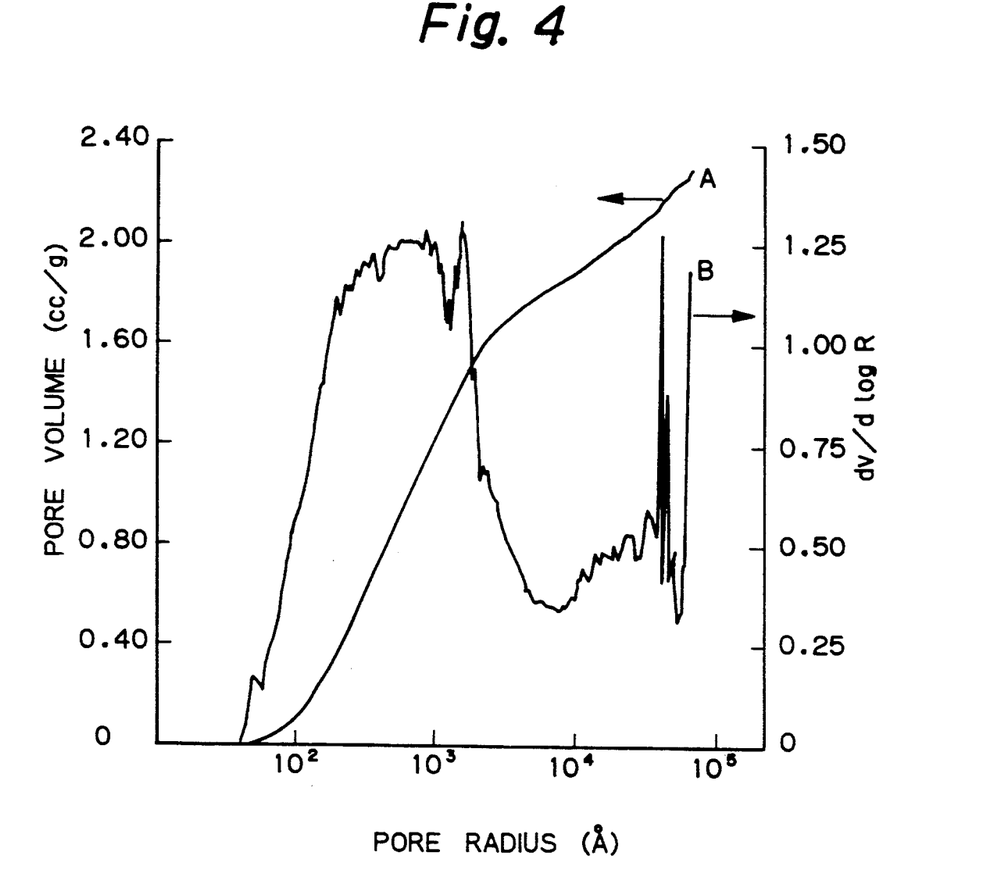

The results of measuring the pore distribution of the composite oxides in Examples 1 and 2 are shown in FIGS. 1 and 2. In the drawings, (A) is a curve showing a cumulative specific pore volume of pores, and (B) is a differential curve (dV/dlog R wherein V is a pore volume and R is a pore radius).

COMPARATIVE EXAMPLES 1 and 2

The same measurements and test as in Examples 1 and 2 were carried out for the composite oxides A and B shown in Table 1 (Comparative Examples 1 and 2) which are commercially available. The results are shown in Table 2.

COMPARATIVE EXAMPLES 3 and 4

Composite oxides were prepared in the same way as in Example 1 except that the production conditions were changed as shown in Comparative Examples 3 and 4 of Table 1.

The resulting composite oxides were measured and tested as in Example 1. The results are shown in Table 2.

TABLE 1

| | Alkali silicate aqueous solution (wt. %) | | 1st step | | |
|---|---|---|---|---|---|
| | Concentration of a sodium sulfate | Concentration calculated as silica | Type of an acid, aqueous solution | Reaction temperature | Neutralization ratio |
| Example 1 | 1 | 8 | Aluminum sulfate aqueous solution (sulfuric acid 23 wt./vol. % $Al_2O_3$ 4 wt. %) | 30 | 25 |
| Example 2 | 1 | 8 | Aluminum sulfate aqueous solution (sulfuric acid 23 wt./vol. % $Al_2O_3$ 4 wt. %) | 25 | 20 |
| Example 3 | 1 | 7 | Aluminum sulfate aqueous solution (sulfuric acid 23 wt./vol. % $Al_2O_3$ 4 wt. %) | 30 | 35 |
| Example 4 | 1 | 7 | Titanium sulfate aqueous solution (sulfuric acid 25 wt./vol. % $TiO_3$ 6 wt. %) | 35 | 30 |
| Example 5 | 1 | 8 | Aluminum sulfate aqueous solution (sulfuric acid 23 wt./vol. % $Al_2O_3$ 4 wt. %) | 30 | 20 |
| Example 6 | 1 | 9 | Aluminum sulfate aqueous solution (sulfuric acid 23 wt./vol % $Al_2O_3$ 4 wt. %) | 35 | 30 |
| Example 7 | 1 | 7 | Aluminum sulfate aqueous solution (sulfuric acid 23 wt./vol. % $Al_2O_3$ 2 wt.%) | 30 | 35 |
| Comparative | | | | | |
| Example 1 | | | ZEOLEX 25 (Rhone Poulenc S.A.) | | |
| Example 2 | | | TIX-O-LEX 25 (Rhone Poulenc S.A.) | | |
| Example 3 | 1 | 6 | Aluminum sulfate aqueous solution (sulfuric acid 24 wt./vol % $Al_2O_3$ 8 wt. %) | 30 | 30 |
| Example 4 | 1 | 8 | Aluminum sulfate aqueous solution (sulfuric acid 23 wt./vol. % $Al_2O_3$ 4 wt. %) | 35 | 20 |

TABLE 1-continued

| | Ageing time (min.) | 2nd step Type of an acid, aqueous solution | Reaction temperature (°C.) | pH after reaction |
|---|---|---|---|---|
| Example 1 | 10 | Aluminum sulfate aqueous solution (sulfuric acid 23 wt./vol. % $Al_2O_3$ 4 wt. %) | 95 | 3.9 |
| Example 2 | 10 | Aluminum sulfate aqueous solution (sulfuric acid 23 wt./vol. % $Al_2O_3$ 4 wt. %) | 95 | 3.1 |
| Example 3 | 10 | Aluminum sulfate aqueous solution (sulfuric acid 23 wt./vol. % $Al_2O_3$ 4 wt. %) | 95 | 4.1 |
| Example 4 | 10 | Aluminum silicate aqueous solution (sulfuric acid 23 wt./vol. % $Al_2O_3$ 2 wt. %) | 96 | 3.6 |
| Example 5 | 10 | Aluminum sulfate aqueous solution (sulfuric acid 23 wt./vol. % $Al_2O_3$ 4 wt. %) | 95 | 3.3 |
| Example 6 | 10 | Aluminum sulfate aqueous solution (sulfuric acid 23 wt./vol. % $Al_2O_3$ 4 wt. %) | 95 | 4.0 |
| Example 7 | 10 | Aluminum sulfate aqueous solution (sulfuric acid 23 wt./vol.% $Al_2O_3$ 2 wt. %) | 96 | 3.6 |
| Comparative | | | | |
| Example 1 | | ZEOLEX 25 (Rhone Poulenc S.A.) | | |
| Example 2 | | TIX-O-LEX 25 (Rhone Poulenc S.A) | | |
| Example 3 | 10 | Aluminum sulfate aqueous solution (sulfuric acid 22 wt./vol. %) | 95 | 3.6 |
| Example 4 | 10 | Aluminum sulfate aqueous solution (sulfuric acid 22 wt./vol. % $Al_2O_3$ 4 wt. %) | 85 | 3.3 |

TABLE 2

| | $iR_2O.jAl_2O_3.kTiO_2.mSiO_2.nH_2O$ | | | | | Crystal structure | Pore volume (cc/g) | | | |
|---|---|---|---|---|---|---|---|---|---|---|
| | i | j | k | m | n | | ① | ② | ③ | ④ |
| Example | | | | | | | | | | |
| 1 | 0.68 | 1 | 0 | 20.6 | 0.25 | amorphous | 2.20 | 2.50 | 1.03 | 1.04 |
| 2 | 0.77 | 1 | 0 | 19.5 | 0.25 | " | 2.38 | 2.63 | 0.88 | 1.15 |
| 3 | 0.71 | 1 | 0 | 42.9 | 0.25 | " | 2.30 | 3.30 | 1.35 | 1.23 |
| 4 | 0.83 | 0.37 | 0.63 | 24.9 | 0.25 | " | 2.20 | 2.41 | 0.95 | 1.01 |
| 5 | 0.97 | 1 | 0 | 12.3 | 0.25 | " | 2.10 | 2.20 | 0.81 | 0.96 |
| 6 | 0.95 | 1 | 0 | 19.1 | 0.25 | " | 2.29 | 2.41 | 0.87 | 0.95 |
| 7 | 0.39 | 1 | 0 | 62.4 | 0.25 | " | 2.93 | 3.64 | 1.57 | 1.52 |
| Comparative Example | | | | | | | | | | |
| 1 | 1.12 | 1 | 0 | 14.9 | 0.25 | " | 1.85 | 2.27 | 0.53 | 1.15 |
| 2 | 1.14 | 1 | 0 | 15.8 | 0.25 | " | 1.90 | 2.30 | 0.48 | 1.11 |
| 3 | 0.96 | 1 | 0 | 28.3 | 0.25 | " | 1.67 | 1.74 | 0.33 | 1.09 |
| 4 | 0.77 | 1 | 0 | 19.5 | 0.25 | " | 1.70 | 1.81 | 0.21 | 1.12 |

| | Average particle size in dispersion in water (μm) | pH | Oil absorption (ml/100 g) | Opacity after printing (%)* | Whiteness** | Opacity of paper*** |
|---|---|---|---|---|---|---|
| Example | | | | | | |
| 1 | 16 | 6.1 | 210 | 78.0 | 58 | 84.3 |
| 2 | 15 | 6.7 | 230 | 77.8 | 58 | 84.5 |
| 3 | 16 | 5.6 | 230 | 78.1 | 57 | 84.2 |
| 4 | 16 | 5.8 | 210 | 78.0 | 59 | 85.0 |
| 5 | 15 | 5.7 | 210 | 77.3 | 58 | 84.7 |
| 6 | 16 | 5.6 | 210 | 77.7 | 58 | 84.5 |
| 7 | 16 | 5.4 | 250 | 78.8 | 57 | 84.0 |
| Comparative Example | | | | | | |
| 1 | 13 | 10.3 | 170 | 74.0 | 58 | 84.7 |
| 2 | 13 | 10.2 | 180 | 74.3 | 58 | 84.8 |
| 3 | 15 | 5.9 | 150 | 73.3 | 57 | 84.1 |
| 4 | 16 | 5.8 | 160 | 73.2 | 58 | 84.3 |

(Note) ①, ②, ③ and ④ in Table 2 show the following items.
①Pore volume of pores having a pore radius of $10^4$ Å or less.
②Pore volume of pores having a pore radius of $5 \times 10^4$ Å or less.
③Pore volume of pores having a pore radius of $3000 - 4 \times 10^4$ Å.
④Pore volume of pores having a pore radius of 100–1000 Å.
*blank = 72.5%
**blank = 54.0%
***blank = 82.2%

What we claim is:

1. A composite oxide represented by the formula $iR_2O \cdot jAl_2O_3 \cdot kTiO_2 \cdot mSiO_2 \cdot nH_2O$, wherein R denotes an alkali metal, i is 0.3 to 1, k is 0 to 0.9, j+k=1, m is 7 to 70, and n is 0.2 to 0.4, said composite oxide being amorphous, and having a cumulative specific pore volume of 2.0 to 3.0 cc/g, with respect to pores having a pore radius of $10^4$ Å or less.

2. The composite oxide of claim 1 having a cumulative specific pore volume of 2.4 to 4.0 cc/g, with respect to pores having a pore radius of $5 \times 10^4$ Å or less, a cumulative specific pore volume of 0.6 cc/g or more, with respect to pores having a pore radius of 3000 to $4 \times 10^4$ Å, and a cumulative specific pore volume of 0.6 cc/g or more, with respect to pores having a pore radius of 100 to 1000 Å.

3. The composite oxide of claim 1 wherein i is 0.5 to 1, k is 0 to 0.9, j+k=1, m is 15 to 65 and n is 0.2 to 0.4.

* * * * *